United States Patent
Matsumoto et al.

(10) Patent No.: US 6,285,170 B1
(45) Date of Patent: Sep. 4, 2001

(54) SWITCHING POWER SUPPLY

(75) Inventors: Akira Matsumoto; Hiroshi Yamazaki, both of Nagano (JP)

(73) Assignee: Nagano Japan Radio Co., Ltd., Nagano (JP)

( * ) Notice: Subject to any disclaimer, the term of this patent is extended or adjusted under 35 U.S.C. 154(b) by 0 days.

(21) Appl. No.: 09/511,487

(22) Filed: Feb. 23, 2000

(30) Foreign Application Priority Data

Feb. 25, 1999 (JP) .................................................. 11-047446

(51) Int. Cl.$^7$ .............................. G05F 1/656; H02M 5/42
(52) U.S. Cl. ................................................. 323/222; 363/89
(58) Field of Search ................................. 323/222, 282, 323/908, 243; 363/56, 49, 58, 86

(56) References Cited

U.S. PATENT DOCUMENTS

| | | | |
|---|---|---|---|
| 4,245,286 | * | 1/1981 | Paulkovich et al. .................... 363/21 |
| 5,202,819 | * | 4/1993 | Min ........................................ 361/436 |
| 5,834,924 | * | 11/1998 | Konopka et al. ..................... 323/222 |
| 5,920,186 | * | 7/1999 | Ninh et al. ............................ 323/908 |

FOREIGN PATENT DOCUMENTS 60-32567  2/1985  (JP) .
4-101666  4/1992  (JP) .

OTHER PUBLICATIONS

English Language Abstract of JP 60–32567. Feb. 19, 1985.
English Language Abstract of JP 4–101666. Apr. 3, 1992.

* cited by examiner

*Primary Examiner*—Rajnikant B. Patel
(74) *Attorney, Agent, or Firm*—Greenblum & Bernstein, P.L.C.

(57) ABSTRACT

A switching power supply comprises a boost converter, a smoothing capacitor for smoothing an output voltage from the boost converter, and inrush current-limiting means for limiting an inrush current flowing into the smoothing capacitor. The inrush current-limiting means is connected between the boost converter and the smoothing capacitor.

6 Claims, 5 Drawing Sheets

SWITCHING POWER SUPPLY

BACKGROUND OF THE INVENTION

1. Field of the Invention

This invention relates to a switching power supply which has a boost converter, and is capable of limiting an inrush current flowing into a smoothing capacitor.

2. Description of the Related Art

In general, a switching power supply incorporating a boost converter has a smoothing capacitor provided therein for smoothing an output voltage from the boost converter. Accordingly, a large inrush current flows into the smoothing converter via the boost converter at the initial stage of power-on. Therefore, this type of switching power supply generally has a power thermistor or a resistor arranged at some location between an AC input and the smoothing capacitor, so as to supply an AC voltage via the power thermistor or the like at the initial stage of power-on, thereby limiting the inrush current to a predetermined value.

A boost power supply 41 shown in FIG. 6 is among switching power supplies of the above-mentioned type as the related art. The power supply 41 includes a fuse 3 for protection against overcurrent, a rectifying diode stack 4, a power thermistor 6 connected between the fuse 3 and the diode stack 4, a boost converter 5, and a smoothing capacitor 7. The boost converter 5 is comprised of a choke coil 11 for voltage boost, a switch 12 formed by a switching element such as an FET, and a diode 13.

In the power supply 41, at the initial stage of power-on, an AC voltage VAC is input from an AC power source 2 to the diode stack 4 via the fuse 3 and the power thermistor 6. At this time, the internal temperature of the power thermistor 6 is approximately equal to the ambient temperature, and hence the power thermistor 6 has a larger resistance value (e.g. 10 Ω) than a resistance value (e.g. 1 Ω) it has when heated. Therefore, if an AC voltage VAC of 100 V is input at the initial stage of power-on, with its phase angle of 90 degrees, i.e. at its peak, a peak current IP of the inrush current is limited to approximately 14.1 A since the peak voltage of the AC voltage VAC is approximately 141 V.

On the other hand, when the capacitor 7 is charged to a predetermined voltage, the switch 12 within the boost converter 5 is controlled by a switching control circuit, not shown. At this time, the boost converter 5 outputs excitation energy of the choke coil 11 via the diode 13 to thereby output a voltage which is higher than a pulsating voltage V1 rectified by the diode stack 4. In this case, the input current IIN dependent on the AC voltage VAC flows through the power thermistor 6, whereby the power thermistor 6 heats itself. As a result, the power thermistor 6 has the resistance value thereof reduced to a smaller value as its temperature becomes higher. Further, when the resistance value has been reduced, the amount of heat generated by the power thermistor 6 becomes small. Thus, in a normal state after power-on of the power supply 41, the parameters consisting of the temperature of the power thermistor 6 increased as it heats itself and the resistance value of the same are stabilized in a predetermined condition, so that in the above example, the resistance value of the power thermistor 6 becomes equal to approximately 1 Ω. In this state, power loss occurring when the input current IIN flows through the power thermistor 6 has been made small, so that the inrush current is limited while attaining the enhancement of the conversion efficiency of the device.

However, the power supply 41 suffers from the following problems: Firstly, there still remains a resistance of approximately 1 Ω in the above example. For this reason, in constructing a switching power supply having a large output, power loss due to the remaining resistance is not negligible, and hence improvement of the conversion efficiency is still desired.

Secondly, another problem occurs when the power is turned on again after restoration of input from momentary interruption. More specifically, in the above example, e.g. when the power supply 41 is continuously operated under an ambient temperature of 40° C., the power thermistor 6 is stable with its resistance value held at approximately 1 Ω. In this state, even if input of the AC voltage VAC is interrupted for a short time (dozens to hundreds of milliseconds, which will cause the charging voltage of the capacitor 7 to drop to a voltage value close to 0 V) due to a power failure or the like, the AC voltage VAC starts to be input again before the temperature of the power thermistor 6 is lowered sufficiently. Assuming that the resistance value of the power thermistor is 1 Ω when the AC voltage is input again, since the peak voltage of the AC voltage VAC is approximately 141 V, the peak current IP of the inrush current is approximately 141 A. A flow of such a large peak current IP not only causes blowing or deterioration of the fuse 3, momentary interruption of the commercial power line, and tripping of a power breaker for household or commercial use, but also it exceeds rated surge current of various electronic components, such as the diode stack 4, arranged in a conductive line for the peak current IP, thereby causing breakage or degradation of the electronic components. This problem inevitably occurs so long as the power thermistor 6 is employed as inrush current-limiting means. Therefore, in general, as a countermeasure against the inrush current after restoration of input from momentary interruption, there is employed a method in which a resistor having a resistance value of several ohms is constantly connected to the conductive line of the AC voltage VAC, thereby limit the peak current IP of the inrush current below a predetermined value or a method of selecting for use electronic components which can withstand the peak current IP which will flow after restoration of input from momentary interruption. However, when the former countermeasure is taken, the constantly connected resistor causes constant power loss, which results in a lowered conversion efficiency of the power supply. On the other hand, the problem with the latter countermeasure is that selection of a fuse 3 having a large rated current for use prevents the fuse 3 from properly blowing and that the size of each electronic component is inevitably increased.

It should be noted that if a resistor is used as inrush current-limiting means in place of the power thermistor 6, large inrush current does not occur after restoration of input from momentary interruption, but the method is basically similar to the above former countermeasure in that power loss is caused by the resistor. Therefore, although the method is somewhat effective in a power supply of a type having a relatively small steady-state current flowing therein, in a power supply of a type having a relatively large steady-state current (e.g. 1 A) flowing therein, large power loss caused by the resistor (e.g. power loss of 10 W when the resistance value is 10 Ω) occurs constantly, which considerably lowers the conversion efficiency of the device.

A power supply 51 shown in FIG. 7 is among switching power supplies as the related art which can attain high conversion efficiency even with a smaller steady-state current flowing therein. In the power supply 51, at the initial stage of power-on, a thyristor 52 is controlled to be in an OFF state, which allows a power thermistor 6 to limit the inrush current. Then, when the charging voltage of a capacitor 7 reaches a predetermined voltage, an activation circuit 61 activates switching control circuits 62 and 63. As a result, a boost converter 5 has its switching operation controlled by the switching control circuit 62 to boost an AC voltage VAC for charging the capacitor 7. At the same time, a switch 9 formed by a switching element such as an FET or the like is controlled by the switching control circuit 63 to switch the charging voltage of the capacitor 7. Consequently, a current flows through a primary winding 8a of a transformer 8, whereby a voltage induced in a secondary winding 8b is generated as an output voltage VO. In this case, a voltage is also induced in an auxiliary winding 8c, and this induced voltage is rectified and smoothed by a diode 53 and a capacitor 54. Then, the rectified and smoothed DC voltage is input to the gate of the thyristor 52, whereby the thyristor 52 is controlled to be in an ON state.

As a result, the steady-state current passes through a diode stack 4 and the thyristor 52 to be input to the boost converter 5. In this case, the voltage between the anode and cathode of the thyristor 52 is approximately 1.1 V to 1.5 V, and hence, if the steady-state current is 1 A, power loss caused by the thyristor 52 in the steady state amounts to approximately 1.1 W to 1.5 W. This power loss is larger than that caused by the power thermistor 6 of the power supply 41. However, if the steady-state current is 5 A, for instance, the power loss caused by the power thermistor 6 is 25 W (5 A·5 A·1 Ω), whereas the power loss caused by the thyristor 52 is 5.5 W to 7.5 W (5 A·1.1 V to 1.5 V), which means that the latter is more excellent in conversion efficiency than the former. It should be noted that a switching element such as a triac, an FET, a transistor, or the like can be used in place of the thyristor 52. Further, it is possible to use a resistor in place of the power thermistor 6.

A power supply 71 shown in FIG. 8 is also among the switching power supplies as the related art which can attain high conversion efficiency. This power supply 71 is similar to the power supply 51 in that a boost converter 5 and a switch 9 are controlled by switching control circuits 62 and 63 (not shown). In a steady state of the power supply 71, thyristors 52 and 72 are each controlled to be in an ON state by a DC voltage generated by a diode 53 and a capacitor 54, whereby an AC voltage VAC brings the thyristors 52 and 72 into conduction in place of a diode stack 4 to be input to the boost converter 5. As a result, the forward voltage (e.g. 0.98 V) of one diode incorporated in the diode stack 4 and a voltage drop by a power thermistor 6 is limited to the forward voltage of the thyristor 52 or 72. In this case, the power supply 71 is distinguished from the power supply 41, in which when the steady-state current is 1 A, power loss of 1 W is caused by the power thermistor 6, in that power loss caused by the thyristor 52 or 72 is relatively reduced to 0.12 W to 0.52 W ((1.1 V to 1.5 V)·1 A–(0.98 V 1 A)). Thus, the power supply 71 has a further improved conversion efficiency.

However, the power supply 71 suffers from the following problems:

Firstly, the power supply 71 requires the use of the two thyristors 52 and 72, a transformer 8 using an auxiliary winding 8c, the diode 53, and the capacitor 54, which makes its circuitry complicated and hence increases manufacturing costs.

Secondly, during momentary interruption of input, even after the charging voltage of the capacitor 7 starts to drop, the switch 9 continues its switching operation until the charging voltage is sufficiently lowered. Therefore, the inrush current is allowed to flow into the capacitor 7 via the thyristors 52 and 72 when the input is restored from momentary interruption before the charging voltage is sufficiently lowered, and hence it is impossible to adequately limit the inrush current flowing after the restoration of the input.

Thirdly, after the restoration of the input from momentary interruption, since the inrush current is not limited by the power thermistor 6, it sometimes happens that an extremely large peak current IP (e.g. from dozens to hundreds of amperes) flows through the thyristor 52 or 72. As a countermeasure to this problem, it is required to select thyristors each having a rated current value large enough to withstand the surge current. In this case, the use of FETs or transistors would make it possible to decrease power loss in the ON state, but the permissible surge current of these elements is generally small. Therefore, actually, the use of thyristors or triacs having large permissible surge currents as well as slightly larger ON-state voltages (i.e. allowing large power losses as well) is indispensable for preventing the power supply 71 from breakdown. Consequently, the power supply 71 suffers from a problem that the conversion efficiency thereof is actually lowered due to the power loss caused by the thyristors 52 and 72.

SUMMARY OF THE INVENTION

It is an object of the invention to provide a switching power supply which makes it possible to reduce the manufacturing costs thereof. It is another object of the invention to provide a switching power supply which is capable of sufficiently limiting an inrush current after restoration of input from momentary interruption and at the same time enhancing conversion efficiency thereof.

(1) To attain the above object, the invention provides a switching power supply including a boost converter, a smoothing capacitor for smoothing an output voltage from the boost converter, and inrush current-limiting means for limiting an inrush current flowing into the smoothing capacitor, wherein the inrush current-limiting means is connected between the boost converter and the smoothing capacitor.

According to this switching power supply, since the inrush current-limiting means is connected between the boost converter and the smoothing capacitor, it is possible to sufficiently reduce power loss caused by the inrush current-limiting means, in spite of simple construction of the switching power supply, which allows reduction of the manufacturing costs and at the same time enhancement of the conversion efficiency of the switching power supply.

(2) Preferably, the switching power supply according to the invention includes a switch circuit connected in parallel with the inrush current-limiting means and operating when an input voltage of the boost converter is lower than a charging voltage of the smoothing capacitor, to permit the output voltage from the boost converter to be output to the smoothing capacitor.

According to this switching power supply, since the switch circuit is connected in parallel with the inrush current-limiting means, it is possible to sufficiently limit the inrush current as well as to improve the conversion efficiency of the device.

(3) Preferably, the inrush current-limiting means is formed by at least one of a thermistor and a resistor.

According to this switching power supply, since the inrush current-limiting means is formed by at least one of a thermistor and a resistor, it is possible to construct the inrush current-limiting means easily and inexpensively.

(4) In the invention, the switch circuit is characterized by being formed by at least one of an FET, a transistor, a thyristor, a triac, and a relay. In this case, it is more preferable that the switch circuit is formed by at least one of an FET, a transistor, and a relay, each of which causes less power loss when it is switched on.

According to this switching power supply, since the switch circuit is formed by at least one of an FET, a transistor, a thyristor, a TRIAC, and a relay, it is possible to produce the switch circuit easily and inexpensively.

In this case, it is more preferable that the switching power supply includes a switching circuit for switching the charging voltage of the smoothing capacitor to thereby induce a voltage in an output winding of a transformer, the switch circuit being formed by an N-channel FET for outputting the output voltage from the boost converter to the smoothing capacitor, under a condition that the voltage induced in the output winding of the transformer is higher than a predetermined voltage or under an equivalent condition.

According to this switching power supply, since the switch circuit is formed by an N-channel FET which operates under a condition that the voltage induced in the output winding of the transformer is higher than a predetermined voltage or under an equivalent condition, it is possible to reduce power loss caused when an input current flows through the switch circuit, thereby further improving the conversion efficiency of the switching power supply.

It should be noted that the present disclosure is related to a subject included in Japanese Patent Application No. 11-47446 filed on Feb. 25, 1999, and all the disclosure in the application is apparently incorporated herein by reference.

BRIEF DESCRIPTION OF THE DRAWINGS

These and other objects and features of the present invention will be explained in more detail below with reference to the attached drawings, wherein:

FIG. 4A is a diagram showing a voltage waveform of an AC voltage VAC, which is useful in explaining operation of the power supply 21 at an initial stage of power-on;

FIG. 4B is a diagram showing a voltage waveform of a pulsating voltage (voltage of pulsating current) V1, which is useful in explaining the operation of the power supply 21 at an initial stage of power-on;

FIG. 4C is a diagram showing a current waveform of an input current IIN, which is useful in explaining the operation of the power supply 21 at the initial stage of power-on;

FIG. 4D is a diagram showing voltage waveforms of an output voltage VO and the pulsating voltage V1, which is useful in explaining the operation of the power supply 21 at the initial stage of power-on;

DESCRIPTION OF THE PREFERRED EMBODIMENTS

Figure 1:
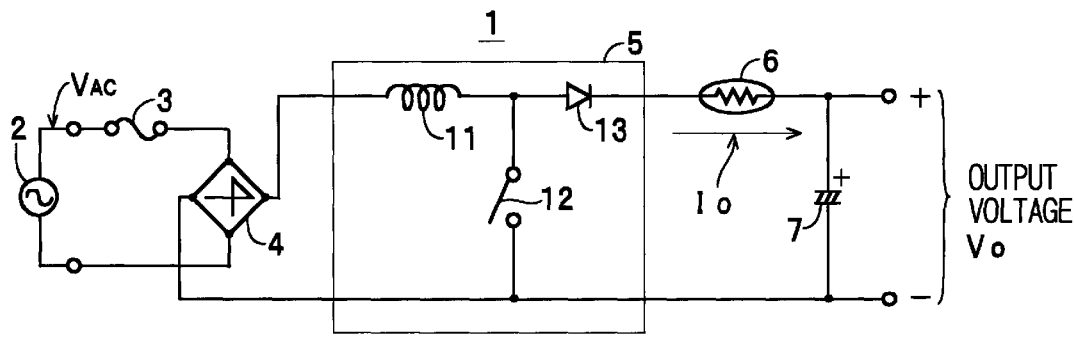
FIG. 1 is a diagram showing circuitry of a power supply 1 according to an embodiment of the invention.

The invention will now be described in detail with reference to drawings showing preferred embodiments thereof. In the following description of each switching power supply (hereinafter simply referred to as "the power supply") according to the invention, component parts and elements similar to those of the power supplies 41, 51 and 71 according to the related art described hereinbefore are designated by identical reference numerals, and detailed description thereof is omitted.

Referring first to FIG. 1, there is shown the circuitry of a power supply 1. The power supply 1 operates at an AC voltage VAC whose effective voltage value ranges e.g. from 90 V to 264 V and is distinguished from the power supply 41 in that a thermistor 6 is connected between a boost converter 5 and a capacitor 7.

In this power supply 1, a switch 12 arranged in the boost converter 5 performs its switching operation to thereby generate an output voltage VO of e.g. 380 V, and an output current IO therefrom is supplied to the capacitor 7 or a load, not shown, via the power thermistor 6. In this case, the value of the output current IO is not dependent on the value of the AC voltage VAC. Further, since the value of the output voltage VO is sufficiently higher than that of the effective voltage of the AC voltage VAC, the value of the output current IO is further reduced compared with the case of the power thermistor 6 being arranged at a location upstream of the boost converter 5. Therefore, power loss caused by the power thermistor 6 when the output current IO flows therethrough is sufficiently decreased, which largely improves the conversion efficiency of the power supply 1 in spite of its simple construction.

More specifically, in the power supplies 1 and 41 of the above examples, the power loss PS caused by the power thermistor 6 is expressed by the following equation (1), wherein RS represents a resistance value of the thermistor 6, and IS represents a value of the current flowing through the thermistor 6.

$$PS = RS \cdot (IS)^2 \tag{1}$$

Accordingly, the power loss PS is proportional to the square of the current value IS. In this case, the current value IS in the power supply 1 is reduced to a value which is smaller by the reciprocal of a voltage boost ratio of the boost converter 5 than in the case of the power thermistor 6 being connected anywhere between the boost converter 5 and the fuse 3. If it is numerically expressed, assuming that the effective voltage of the AC voltage VAC is 100 V and that electric power supplied to a load is constantly 100 W, the current value IS is 1 A in the power supply 41 according to the related art, whereas it is 1/3.8 A in the power supply 1. Therefore, the power supply 1 has its power loss PS reduced to $1/(3.8)^2$ of the power loss caused in the power supply 41.

As described above, according to the power supply 1 of the present embodiment, the power thermistor 6 is connected between the boost converter 5 and the capacitor 7, whereby it is possible to sufficiently reduce the power loss PS caused by the power thermistor 6, in spite its simple construction, which allows reduction of the manufacturing costs and at the same time enhancement of the conversion efficiency of the power supply 1.

Figure 2:
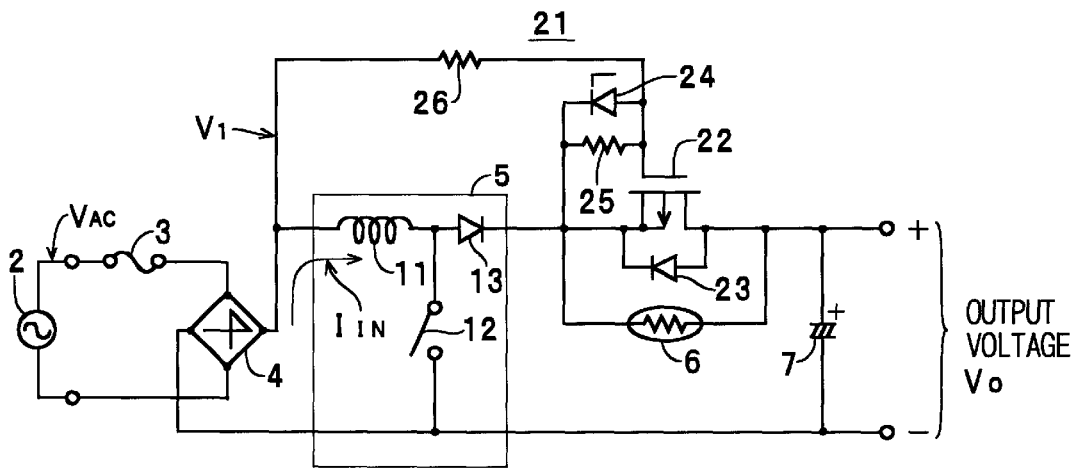
FIG. 2 is a diagram showing circuitry of a power supply 21 according to another embodiment of the invention.

Next, a power supply 21 according to another embodiment will be described with reference to FIG. 2.

As shown in the figure, the power supply 21 has a P-channel FET 22 which corresponds to a switch circuit of the invention and a diode 23 are connected in parallel with a power thermistor 6. In this embodiment, the diode 23 is formed by a diode which is identical to a body diode within the FET 22 or one which is separate from and independent of the body diode. Further, a resistor 25 and a Zener diode 24 are connected in parallel with each other between the gate and source of the FET 22. A resistor 26 for use in biasing the FET 22 is connected between the gate of the FET 22 and an output terminal of a diode stack 4. The FET 22 automatically enters its ON state when the following equation (2) is satisfied, wherein V1 represents a value of a pulsating voltage (voltage of pulsating current) V1 generated by the diode stack 4, and Vth represents a threshold voltage of the FET 22.

$$V1 < VO - Vth \quad (2)$$

Figure 4A:
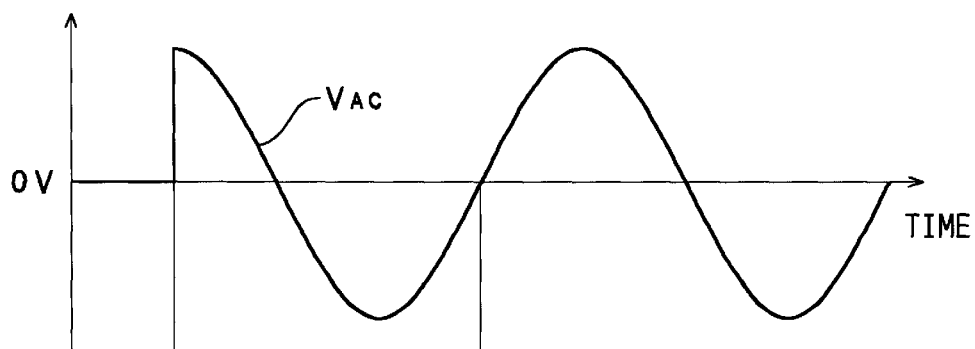
Figure 4B:
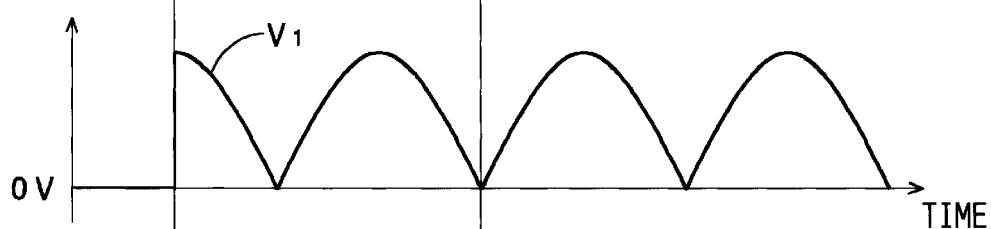

Next, the operation of the power supply 21 will be described with reference to FIG. 4. At the initial stage of power-on, if the AC voltage VAC is input, as shown in FIG. 4A, with its phase angle of 90 degrees, i.e. at its peak, the diode stack 4 performs full-wave rectification of the AC voltage VAC to thereby generate the pulsating voltage V1 shown in FIG. 4B. During a time period between times t1 and t3 at the initial stage of power-on, since the pulsating voltage V1 is higher than the voltage value (VO−Vth) as shown in FIG. 4D, the FET 22 is held in its OFF state. As a result, an input current IIN flows through a choke coil 11, a diode 13, and the power thermistor 6 into the capacitor 7, whereby the capacitor 7 is charged. Before flowing into the capacitor 7, the input current IIN is limited to a predetermined value by the thermistor 6. It should be noted that the input current IIN stops flowing at a time t2 when the pulsating voltage V1 becomes equal to the charging voltage of the capacitor 7.

On the other hand, during a time period from the time t3 the capacitor has been charged to a certain level to a time point t4, the pulsating voltage V1 is lower than the voltage value (VO−Vth). For this reason, the FET 22 is in the ON state. However, since the pulsating voltage V1 is below the voltage value (VO−Vth), the input current IIN does not flow in. During the following time period between the time t4 and a time t7, the pulsating voltage V1 is higher than the voltage value (VO−Vth), so that the FET 22 is held in its OFF state again.

Figure 4C:
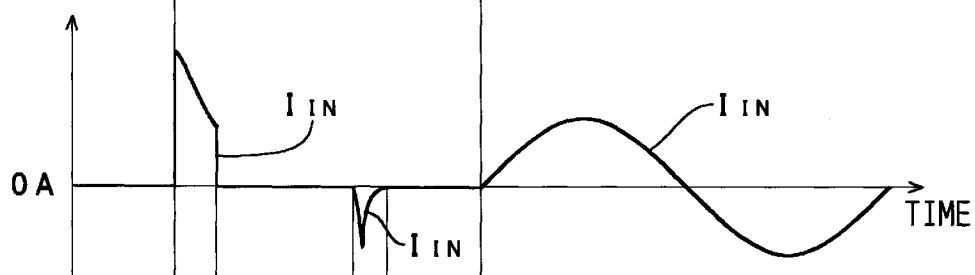
Figure 4D:
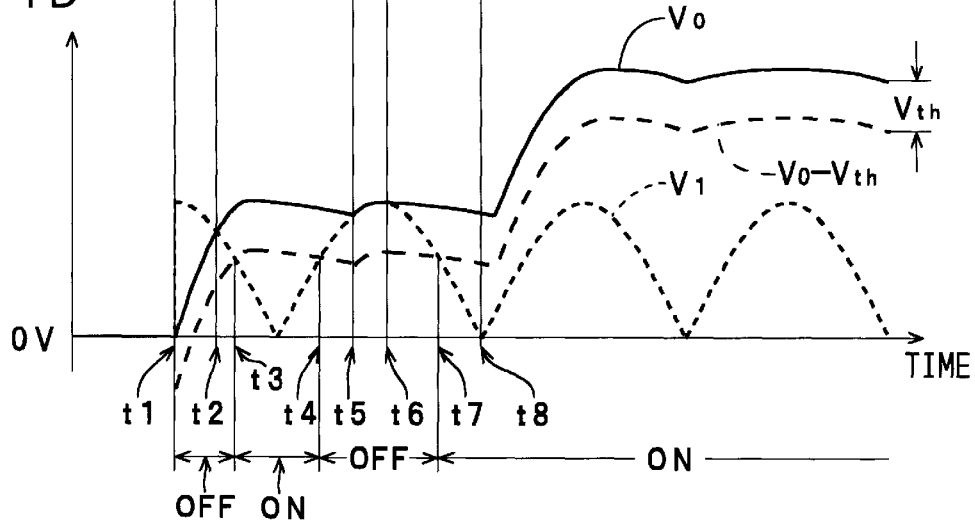

During a time period between times t5 and t6, the pulsating voltage V1 is higher than the charging voltage of the capacitor 7, and hence the input current IIN flows into the capacitor 7 via the power thermistor 6 over an extremely short time period as shown in FIG. 4C, whereby the charging voltage of the capacitor 7 becomes approximately equal to the pulsating voltage V1. It should be noted that the input current IIN stops flowing after the time t6 because the charging voltage of the capacitor 7 becomes lower than the pulsating voltage V1.

Then, at the time t7, the pulsating voltage V1 becomes lower than the voltage value (VO−Vth), and hence the FET 22 enters its ON state. However, since the pulsating voltage V1 is below the voltage value (VO−Vth), the input current IIN does not flow in. Thereafter, at a time t8, the boost converter 5 starts its operation. When the boost converter 5 operates, the input current IIN flows into the capacitor 7 not via the power thermistor 6 but via the FET 22. In this case, since the power loss caused by the flow of the input current IIN through the FET 22 is smaller than that caused by the flow of the input current IIN through the thermistor 6, the conversion efficiency of the power supply 21 can be further improved than by the power supply 1. From the time t8 on, the pulsating voltage V1 is held below the voltage value (VO−Vth), so that the FET 22 remains in its ON state, whereby the input current IIN continues to flow into the capacitor 7 via the FET 22. In this case, even though the pulsating voltage V1 is below the voltage value (VO−Vth), the operation of the boost converter 5 allows the input current IIN to flow continuously through the FET 22 into the capacitor 7, as shown in FIG. 4C, whereby the capacitor 7 is charged.

Figure 5A:
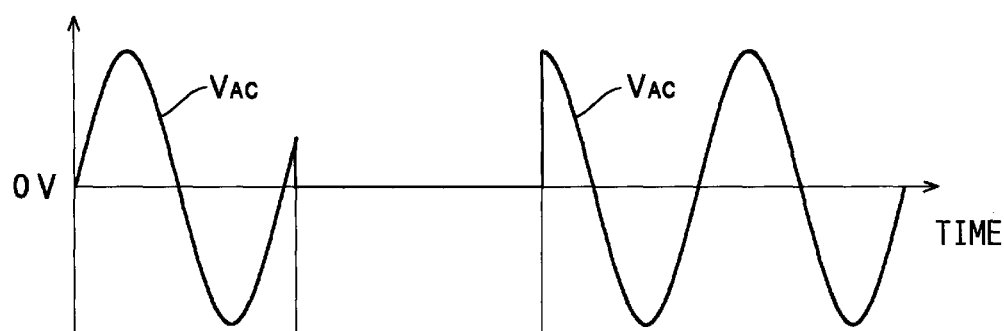
FIG. 5A is a diagram showing the voltage waveform of the AC voltage VAC, which is useful in explaining operation of the power supply 21 after restoration of input from momentary interruption.
Figure 5B:
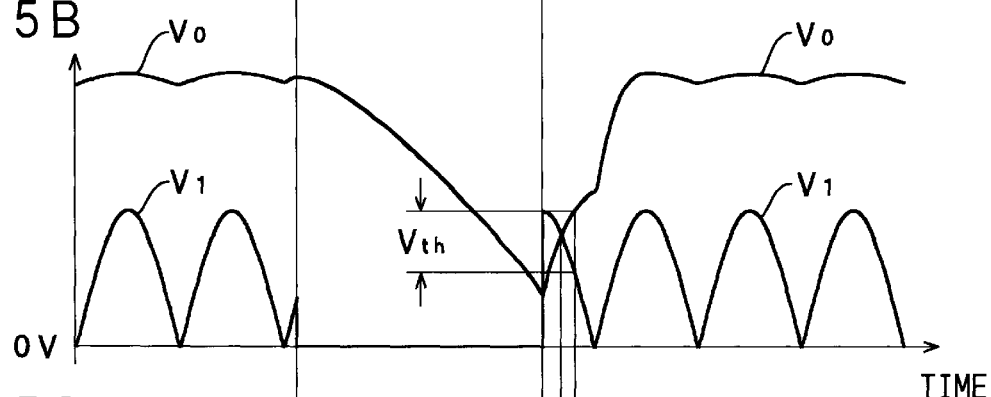
FIG. 5B is a diagram showing the voltage waveforms of the output voltage VO and the pulsating voltage V1, which is useful in explaining the operation of the power supply 21 after restoration of input from momentary interruption.
Figure 5C:
FIG. 5C is a diagram showing the current waveform of the input current IIN, which is useful in explaining the operation of the power supply 21 after restoration of input from momentary interruption.
Figure 5D:
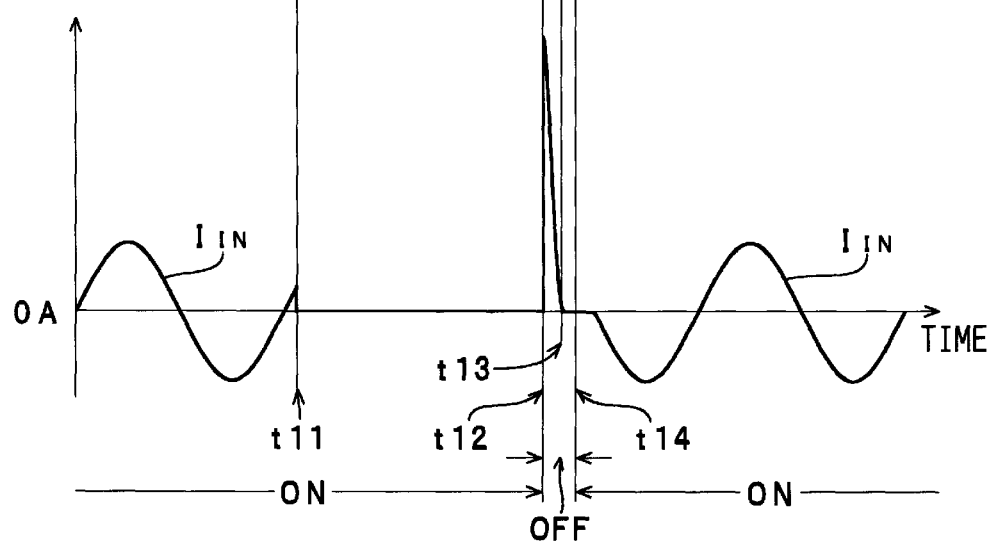
FIG. 5D is a diagram showing a current waveform of an input current IIN in a power supply 71 according to the related art.
Figure 6:
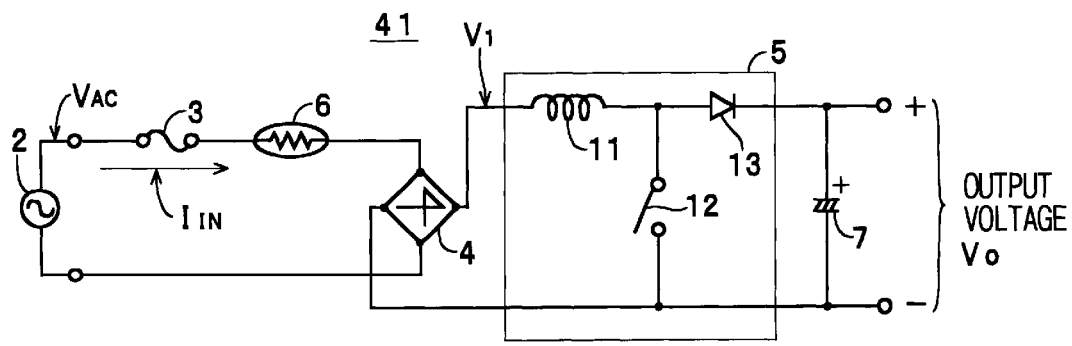
FIG. 6 is a diagram showing circuitry of a power supply 41 according to the related art.

On the other hand, when momentary interruption of input occurs at a time t11 as shown in FIG. 5A, the charging voltage of the capacitor 7 progressively drops as shown in FIG. 5B. Subsequently, when the power is restored at a time t12 shortly after the time t11, the input current IIN starts to flow into the capacitor 7 via the power thermistor 6 as shown in FIG. 5C and this continues during a time period from the time point t12 to a time point t14 over which the pulsating voltage V1 is above the voltage value (VO−Vth) as shown in FIG. 5B. During this time period, since the input current IIN was flowing through the FET 22 before the time point t12, the power thermistor 6 has its temperature decreased to the ambient temperature and the resistance value thereof increased, and hence the input current IIN is limited to a predetermined value which is sufficiently small. Then, from the time t14 on, the pulsating voltage V1 is held below the voltage value (VO−Vth), so that the FET 22 operates continuously, whereby the input current IIN flows into the capacitor 7 via the FET 22.

In the power supply 71 according to the related art, since the inrush current flows into the capacitor 7 via the thyristors 52 and 72 without being limited by the power thermistor 6, an extremely large input current IIN flows over the time period from the time t12 to the time t13 the pulsating voltage V1 and the charging voltage of the capacitor 7 become equal to each other. The power supply 1 is distinguished from the power supply 71 in that the input current IIN is limited to the predetermined value, which makes it possible to employ an inexpensive FET 22 (or a transistor) whose ON-state voltage is sufficiently small though its permissible surge current is small. Thus, in comparison with the case of the power supply 41, the manufacturing costs of the power supply 1 can be further reduced, and the conversion efficiency of the same can be further improved.

As described above, according to the power supply 1, the FET 22 which operates when the pulsating voltage V1 is lower than the charging voltage of the capacitor 7, so as to output the output voltage of the boost converter 5 to the capacitor 7 is connected in parallel with the power thermistor 6, whereby it is possible to sufficiently limit the inrush current flowing after restoration of input from momentary interruption as well as to enhance conversion efficiency of the power supply 1.

Figure 3:
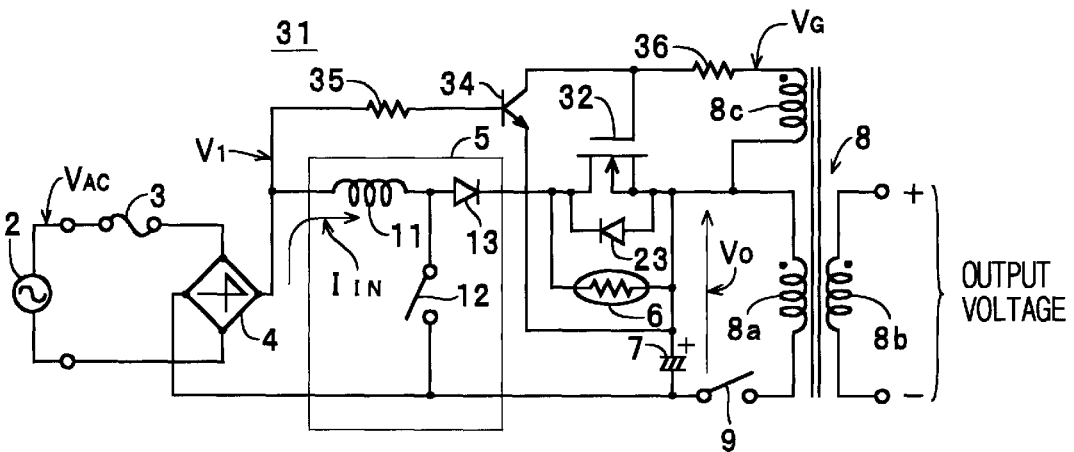
FIG. 3 is a diagram showing circuitry of a power supply 31 according to still another embodiment of the invention.

Next, a power supply 31 according to a still further embodiment will be described with reference to FIG. 3. The basic operation of the power supply 31 is substantially the same as that of the power supply 1, so that description is made mainly of different portions or points in the arrangement and operation of the power supply 31 from those of the power supply 1.

Figure 7:
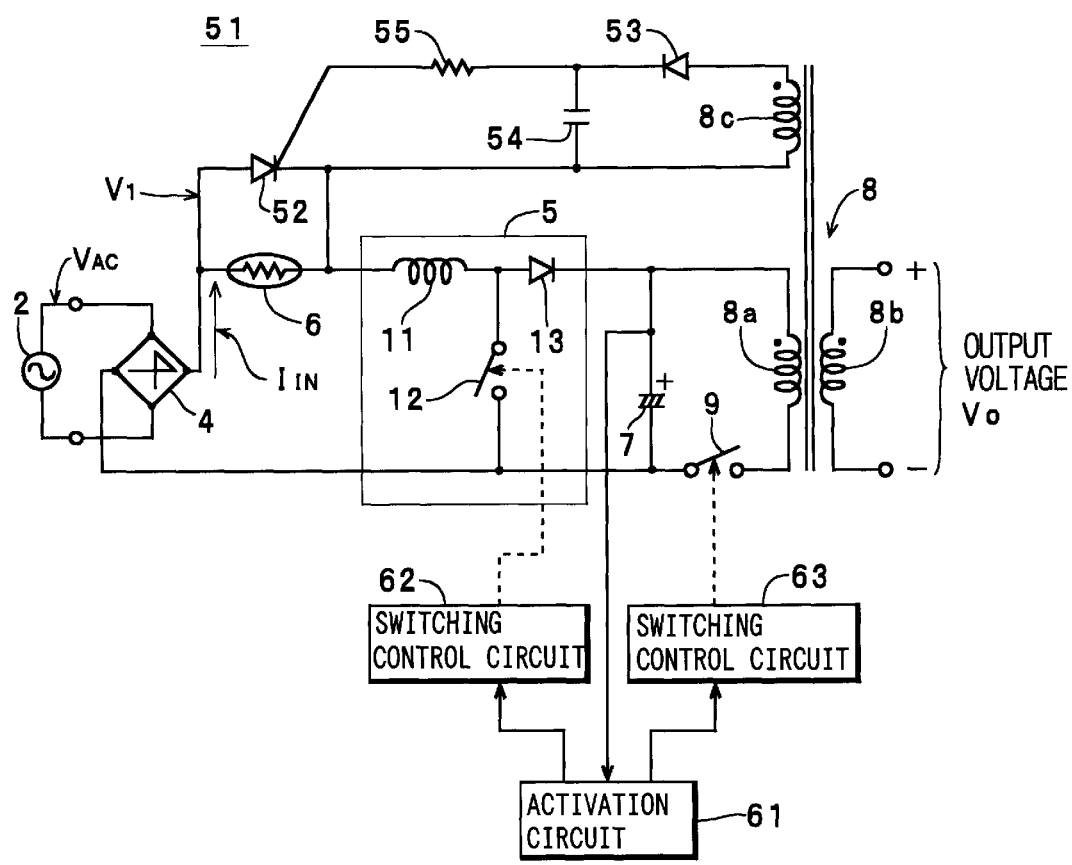
FIG. 7 is a diagram showing circuitry of a power supply 51 according to the related art.
Figure 8:
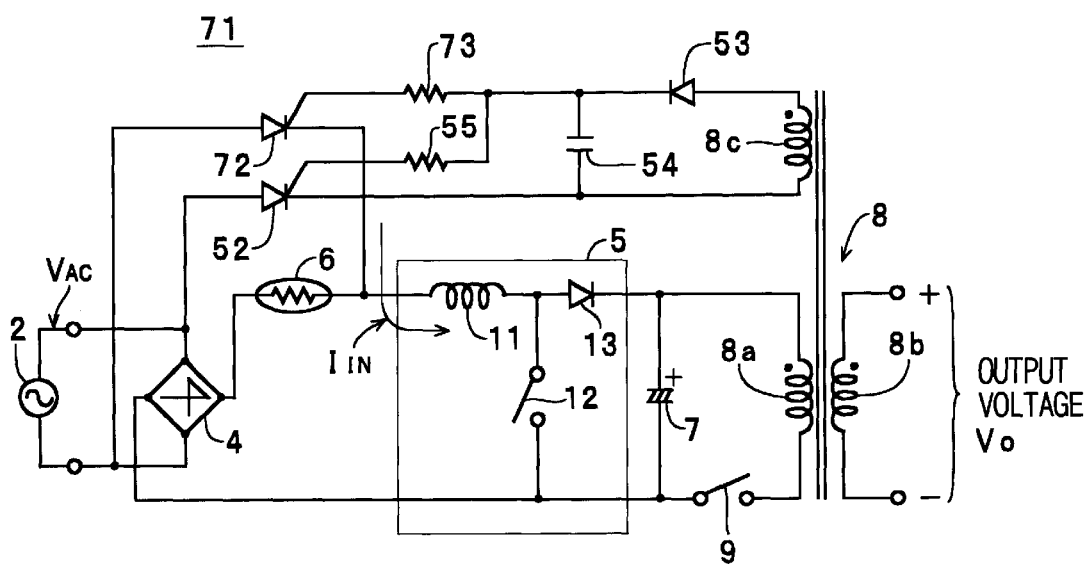
FIG. 8 is a diagram showing circuitry of the power supply 71 according to the related art.

The power supply 31 which is a forward-type DC/DC converter is distinguished from the power supply 21 in that the switch circuit of the invention is formed by an N-channel FET 32 and that a series circuit formed by an auxiliary winding 8c of a transformer 8 and a resistor 36 as well as the collector of a transistor 34 are connected between the gate and source of the FET 32. Further, the transistor 34 has its base connected to an output terminal of a diode stack 4 via a resistor 35 and its emitter connected to the positive terminal of a capacitor 7. In this embodiment, the FET 32 operates when the voltage across the auxiliary winding 8c of the transformer 8 is above a predetermined value (equivalently, when the voltage induced in a secondary winding 8b of the transformer 8 is above the predetermined value) and stops its operation when a pulsating voltage V1 is higher than a charging voltage of the capacitor 7 by a forward voltage between the base and emitter of the transistor 34 in its ON state. It should be noted that a switch 12 in a boost converter 5 and a switch 9 are controlled by the respective switching control circuits 62 and 63 shown in FIG. 7.

In the power supply 31, neither the boost converter 5 nor the switch 9 is driven at the initial stage of power-on so that the gate voltage of the FET 32 is held at 0 V, whereby the PET 32 is held in an inoperative state. As a result, an input current IIN flows into the capacitor 7 via a power thermistor 6. When the charging voltage of the capacitor 7 exceeds a predetermined value, the switching control circuit 62 operates to control switching operation of the switch 12. As a result, the pulsating voltage V1 is boosted, whereby the charging voltage of the capacitor 7 becomes higher than a peak value of the pulsating voltage V1. At the same time, the switching control circuit 63 also operates to control switching operation of the switch 9. At this time, a current dependent on the charging voltage of the capacitor 7 flows through a primary winding 8a of the transformer 8 to thereby induce a voltage in the secondary winding 8b. This induced voltage is rectified and smoothed by a rectifying and smoothing circuit, not shown, whereby an output voltage is generated.

At the same time, a voltage is induced in the auxiliary winding 8c as well to be supplied as a drive voltage VG to the gate of the FET 32 via the resistor 36. In this case, since the charging voltage of the capacitor 7 is higher than the pulsating voltage V1, a reverse bias voltage is applied between the base and emitter of the transistor 34, whereby the transistor 34 is held in an inoperative state. Accordingly, the FET 32 is controlled to be in an ON state by the drive voltage VG applied to the gate thereof. As a result, the input current IIN is conducted not through the power thermistor 6 but through the drain and source of the FET 32 to charge the capacitor 7. In this embodiment, since the FET 32 is of an N-channel type, the ON-state voltage between its drain and source is smaller than that in the P-channel FET, and hence the power loss caused by the flow of the input current IIN therethrough can be reduced, which enables further enhancement of the conversion efficiency of the device.

After restoration of input from momentary interruption, the pulsating voltage V1 becomes higher than the charging voltage of the capacitor 7, so that the transistor 34 operates to supply the drive voltage VG to the capacitor 7 via the resistor 36 and the collector and emitter of the transistor 34 itself. Accordingly, the gate voltage of the FET 32 becomes lower than a threshold voltage of the same, whereby the FET 32 is controlled to be in its OFF state. As a result, the input current IIN is conducted not through the FET 32 but through the power thermistor 6 to charge the capacitor 7. At this time, since the temperature of the power thermistor 6 is lowered to the ambient temperature, the inrush current is limited to a predetermined value.

As described above, the power supply 31 is provided with the switch 9 for inducing a voltage in the secondary winding 8b of the transformer 8 by switching the charging voltage of the capacitor 7, and the FET 32 is formed by an N-channel FET, whereby power loss caused by the flow of the input current IIN can be reduced, and hence it is possible to further enhance the conversion efficiency of the power supply.

It should be noted that the present invention is not limited to the above embodiments, but the construction thereof can be modified as required. For example, although in the embodiments, the FETs 22 and 23, are used for the respective switch circuits, this is not limitative, but any of switches, such as transistors, thyristors, triacs, relays, and so forth can be used, or alternatively, it is possible to combine some of them to form the switching circuit. Further, the inrush current-limiting means is not limited to the power thermistor 6, but a resistor or a combination of the power thermistor 6 and a resistor may be used. Moreover, although in the power supply 31, the FET 32 is driven by the voltage induced in the auxiliary winding 8c, this is not limitative, but it is possible to cause the FET 32 to operate under a condition that the voltage induced in the secondary winding (output winding) 8b of the transformer 8 is above a predetermined value or under an equivalent condition.

Further, it goes without saying that various types of circuit configurations which can be designed by those skilled in the art can be employed for the boost converter 5, the switching control circuits 62 and 63 and other circuits. Still further, although the power supply 31 is of a forward type, it may be a flyback power supply, and the switches 9 and 12 can be formed by various switching elements such as FETs, transistors, or the like.

What is claimed is:

1. A switching power supply comprising a boost converter, a smoothing capacitor that smooths an output voltage from said boost converter, and inrush current-limiting device that limits an inrush current flowing into said smoothing capacitor, wherein said inrush current-limiting device is connected between said boost converter and said smoothing capacitor, said switching power supply further comprising a switch circuit connected in parallel with said inrush current-limiting device and operating when an input voltage of said boost converter is lower than a charging voltage of said smoothing capacitor, to permit said output voltage from said boost converter to be output to said smoothing capacitor.

2. A switching power supply according to claim 1, wherein said inrush current-limiting device is formed by at least one of a thermistor and a resistor.

3. A switching power supply according to claim 1, wherein said switch circuit is formed by at least one of an FET, a transistor, a thyristor, a triac, and a relay.

4. A switching power supply according to claim 1, wherein said switch circuit comprises at least one of an FET, a transistor, a thyristor, a triac, and a relay, said switching power supply further comprising a switching circuit that switches said charging voltage of said smoothing capacitor to thereby induce a voltage in an output winding of a transformer, said switch circuit comprising an N-channel FET that outputs said output voltage from said boost converter to said smoothing capacitor, when said voltage induced in said output winding of said transformer is higher than a predetermined voltage or under an equivalent condition.

5. A switching power supply according to claim 3, including a switching circuit for switching said charging voltage of said smoothing capacitor to thereby induce a voltage in an output winding of a transformer, said switch circuit being formed by an N-channel FET for outputting said output voltage from said boost converter to said smoothing capacitor, under a condition that said voltage induced in said output winding of said transformer is higher than a predetermined voltage or under an equivalent condition.

6. A switching power supply according to claim 1, wherein said inrush current-limiting device comprises at least one of a thermistor and a resistor, and said switch circuit comprises at least one of an FET, a thyristor, a triac, and a relay, said switching power supply further comprising a switching circuit that switches said charging voltage of said smoothing capacitor to thereby induce a voltage in an output winding of a transformer, said switching circuit comprising an N-channel FET that outputs said output voltage from said boost converter to said smoothing capacitor, when said voltage induced in said output winding of said transformer is higher than a predetermined voltage or under an equivalent condition.

* * * * *